(No Model.)

J. THINNES.
EXPANSION FASTENER.

No. 462,601. Patented Nov. 3, 1891.

WITNESSES:
Edward Wolff
William Miller

INVENTOR:
Jacob Thinnes.
BY
Van Santvoord & Hauff
ATTORNEYS

UNITED STATES PATENT OFFICE.

JACOB THINNES, OF BROOKLYN, NEW YORK.

EXPANSION-FASTENER.

SPECIFICATION forming part of Letters Patent No. 462,601, dated November 3, 1891.

Application filed January 29, 1891. Serial No. 379,574. (No model.)

*To all whom it may concern:*

Be it known that I, JACOB THINNES, a citizen of the United States, residing at Brooklyn, in the county of Kings and State of New York, have invented new and useful Improvements in Expansion-Fasteners, of which the following is a specification.

This invention relates to an improvement in expansion-fasteners suitable for various purposes—as, for example, securing rings or hooks to blocks which are to be hoisted in building or in securing casters to furniture; and the invention consists in the details of construction set forth in the following specification and claims, and illustrated in the annexed drawings, in which—

Figure 1:
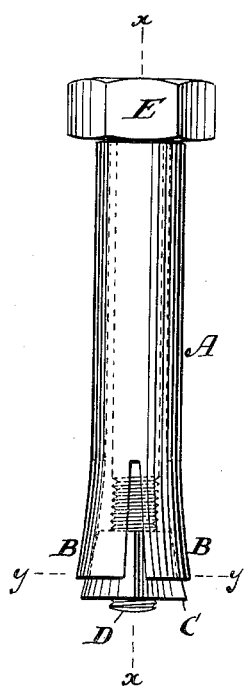
Figure 2:
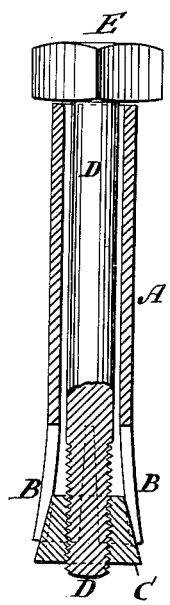
Figure 4:
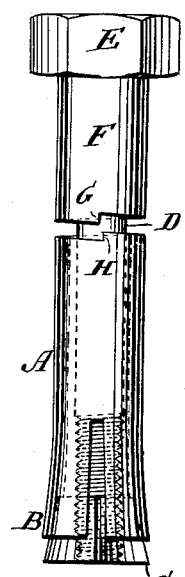
Figure 5:
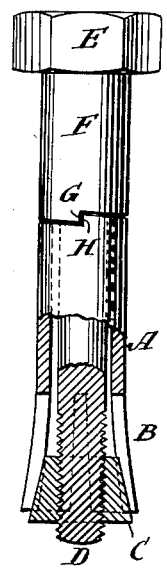
Figure 3:
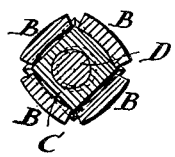

Figure 1 is an elevation of an expansion-fastener. Fig. 2 is a section along $xx$, Fig. 1. Fig. 3 is a section along $y\ y$, Fig. 1. Fig. 4 shows a modification. Fig. 5 shows the device of Fig. 4 when locked.

In the drawings, the letter A indicates an expanding tube or sleeve. The tube is made expanding by having a portion slitted so as to form expanding jaws B. The jaws are expanded by a suitable expansion-screw.

In the drawings the expansion-screw is shown as consisting of a nut C, made to travel in the sleeve, and a screw-threaded shank D, having a head E for the engagement of a wrench or screw-driver. The jaws B, as seen in Fig. 3, surround and inclose the nut C, so that the nut in its movement will not chafe or rub against the side of the cavity in which the sleeve sits.

In the construction shown in the drawings the nut C travels lengthwise in the sleeve, while the shank D merely rotates in said sleeve, so that the shank is not moved farther into or out of the sleeve, but retains the position shown in the drawings. By making the nut C angular and causing the angles of the nut to sit into the slits between the jaws B the nut is prevented from partaking of the rotation of the shank D.

In the modification shown in Figs. 4 and 5 the shank D has an enlarged portion F provided with a shoulder G and the sleeve has a shoulder H. When the shank and sleeve are close enough together to enable the shoulders G H to interlock, as seen in Fig. 5, the shank D is locked against unscrewing.

As the jaws B extend completely about the nut C, said jaws are enabled to get a firm grip in a cavity or hole, even if said hole has straight walls instead of being dovetailed. When the device is to be used for hoisting, the head E is provided with a ring, an eye, or a hook (not shown) for engaging suitable tackle. In case the device is used to secure casters the shank D can be used as the support or shaft for the swivel-arm of the caster.

Of course I do not limit myself to the use of the expansion-fastening in hoisting or for securing casters, as I can apply the fastening wherever it is suitable—as, for example, in securing door-knobs.

What I claim as new, and desire to secure by Letters Patent, is—

1. The combination, with an expansible tube or sleeve, of an expansion-nut made to travel in the sleeve and an actuating-shank for the nut, substantially as described.

2. The combination, with the tube or sleeve having a portion slitted so as to form expanding jaws, of an expansion-nut made to travel in said sleeve and an actuating-shank for the nut, said jaws being made to surround and inclose the nut, substantially as described.

3. The combination, with an expansible tube or sleeve, of an expansion-screw for said sleeve, said sleeve and screw being provided with locking-shoulders adapted to engage one another, substantially as described.

In testimony whereof I have hereunto set my hand in the presence of two subscribing witnesses.

JACOB THINNES.

Witnesses:
WM. C. HAUFF,
E. F. KASTENHUBER.